US012763366B2

(12) United States Patent
Park et al.

(10) Patent No.: US 12,763,366 B2
(45) Date of Patent: Oct. 13, 2026

(54) ELECTROLYTE ADDITIVES FOR SECONDARY BATTERIES, NON-AQUEOUS ELECTROLYTES FOR LITHIUM SECONDARY BATTERIES INCLUDING THE SAME, AND LITHIUM SECONDARY BATTERIES INCLUDING THE SAME

(71) Applicant: DUKSAN ELECTERA CO., LTD., Sejong (KR)

(72) Inventors: Jung Woo Park, Daejeon (KR); Tae Woo Kim, Cheonan-si (KR); Ji Seung Kim, Sejong (KR); Sun Hwa Lee, Cheongan-si (KR); Su Wan Lee, Cheonan-si (KR)

(73) Assignee: DUKSAN ELECTERA CO., LTD., Sejong (KR)

( * ) Notice: Subject to any disclaimer, the term of this patent is extended or adjusted under 35 U.S.C. 154(b) by 110 days.

(21) Appl. No.: 18/279,044

(22) PCT Filed: Aug. 25, 2022

(86) PCT No.: PCT/KR2022/012757
§ 371 (c)(1),
(2) Date: Aug. 25, 2023

(87) PCT Pub. No.: WO2024/038942
PCT Pub. Date: Feb. 22, 2024

(65) Prior Publication Data

US 2025/0030049 A1 Jan. 23, 2025

(30) Foreign Application Priority Data

Aug. 17, 2022 (KR) ........................ 10-2022-0102376

(51) Int. Cl.
*H01M 10/0567* (2010.01)
*H01M 4/02* (2006.01)
*H01M 4/587* (2010.01)
*H01M 10/052* (2010.01)

(52) U.S. Cl.
CPC ....... *H01M 10/0567* (2013.01); *H01M 4/587* (2013.01); *H01M 10/052* (2013.01); *H01M 2004/027* (2013.01); *H01M 2300/0025* (2013.01)

(58) Field of Classification Search
None
See application file for complete search history.

(56) References Cited

U.S. PATENT DOCUMENTS

2011/0177393 A1* 7/2011 Park .................... C04B 35/6269 252/502

FOREIGN PATENT DOCUMENTS

| | | | | |
|---|---|---|---|---|
| CN | 114024029 A * | 2/2022 | ........ | H01M 10/0567 |
| KR | 10-2020-0097658 A | 8/2020 | | |
| WO | 2010-053162 A1 | 4/2012 | | |

OTHER PUBLICATIONS

Non-final Office Action mailed on Nov. 1, 2022 from Korean Patent Office for Application No. 10-2022-0102376.
Notice of Allowance mailed on Jan. 10, 2023 from Korean Patent Office for Application No. 10-2022-0102376.

* cited by examiner

*Primary Examiner* — Zhongqing Wei

(57) ABSTRACT

The present invention relates to a novel electrolyte additive, a non-aqueous electrolyte for a lithium secondary battery comprising the novel electrolyte additive, and a lithium secondary battery comprising the non-aqueous electrolyte. More specifically, the present invention relates to a non-aqueous electrolyte for a lithium secondary battery comprising an additive capable of forming a stable film on an electrode surface. The present invention also relates to a lithium secondary battery comprising such a non-aqueous electrolyte, thereby, a high temperature lifespan of the lithium secondary battery is not deteriorated, resistance does not increase when the lithium secondary battery is stored at a high temperature, and expansion of a volume (thickness) of the lithium secondary battery is suppressed when the lithium secondary battery is stored at a high temperature.

7 Claims, No Drawings

ELECTROLYTE ADDITIVES FOR SECONDARY BATTERIES, NON-AQUEOUS ELECTROLYTES FOR LITHIUM SECONDARY BATTERIES INCLUDING THE SAME, AND LITHIUM SECONDARY BATTERIES INCLUDING THE SAME

CROSS-REFERENCE TO RELATED APPLICATION(S)

This application is a national phase entry of International Application No. PCT/KR2022/012757, filed on Aug. 25, 2022, which claims priority to Korean Application No. 10-2022-0102376, filed on Aug. 17, 2022, the entire contents of which are incorporated herein by reference.

TECHNICAL FIELD

The present invention relates to an electrolyte additive for a secondary battery. More specifically, the present invention relates to a non-aqueous electrolyte additive with excellent effectiveness in removing decomposition products generated from lithium salts, and a non-aqueous electrolyte for a lithium secondary battery including the additive. The present invention relates to a non-aqueous electrolyte additive capable of forming a firm solid electrolyte interphase (SEI) on the surface of a negative electrode, and a non-aqueous electrolyte for a lithium secondary battery including the additive. The present invention also relates to a lithium secondary battery including the non-aqueous electrolyte. The high-temperature performance of the lithium secondary battery of the present invention is improved by including the non-aqueous electrolyte.

BACKGROUND ART

Lithium secondary batteries are used not only as portable power sources for mobile phones, notebook computers, etc., but are also expanding their applications to medium and large power sources for electric bicycles, electric vehicles (EV), and the like. With the expansion of such application fields, there is a demand for a lithium secondary battery capable of maintaining excellent performance not only at room temperature but also in harsher external environments such as high or low temperature environments.

Lithium secondary batteries that are currently widely used include, in general, a carbon-based negative electrode capable of intercalating and deintercalating lithium ions, a transition metal oxide-based positive electrode containing lithium, a non-aqueous electrolyte in which lithium salt is dissolved in a mixed carbonate-based organic solvent, and a separator that prevents contact between the positive electrode and the negative electrode. In a lithium secondary battery, during charging, lithium atoms in the positive electrode are ionized into lithium ions and electrons, and the electrons move to the negative electrode through an external circuit and the lithium ions cross the non-aqueous electrolyte and the separator to move to the negative electrode part and are inserted into the carbon negative electrode. During discharging, the electrons move to the positive electrode through the external circuit, and at the same time, the lithium ions are deintercalated from the carbon negative electrode and cross the non-aqueous electrolyte and the separator to move to the positive electrode. The lithium ions and the electrons meet at the positive electrode to form lithium atoms in a stable state. A lithium secondary battery generates electrical energy while repeating such charging and discharging.

In a lithium secondary battery, metal ions are eluted from the surface of the positive electrode as the positive electrode active material is structurally destroyed during charging and discharging. The metal ions eluted from the positive electrode are electrodeposited on the negative electrode and deteriorate the negative electrode. The deterioration of the negative electrode tends to be further accelerated when the potential of the positive electrode is high or the secondary battery is exposed to high temperature.

In order to solve this problem, a method of adding compounds capable of forming a film, that is, a solid electrolyte interphase (SEI) on the surface of the negative electrode to the non-aqueous electrolyte has been proposed. However, the addition of these electrolyte additives may cause other side effects such as deterioration in lifespan performance of the secondary battery and deterioration in high-temperature stability of the secondary battery. Thus, another problem arises in that overall performance of the lithium secondary battery is reduced.

As a lithium salt of a lithium secondary battery, $LiPF_6$ is mainly used to realize suitable characteristics of a secondary battery. It is known that the $PF_6^-$ anion of $LiPF_6$ is very vulnerable to heat and is thermally decomposed when the secondary battery is exposed to high temperature to generate Lewis acid such as $PF_5$. $PF_5$ thus generated not only causes decomposition of organic solvents such as ethylene carbonate, but also generates hydrofluoric acid (HF) to accelerate the elution of transition metals from the positive electrode active material. The transition metal thus eluted electrodeposited on the positive electrode and causes an increase in the resistance of the positive electrode, is electrodeposited on the negative electrode and causes self-discharge of the negative electrode, or destroys the solid electrolyte interphase (SEI) on the negative electrode, thereby further decomposes the electrolyte. This causes an increase in the resistance of the secondary battery and deterioration in its lifespan. This decomposition reaction of the electrolyte also causes gas to be generated inside the secondary battery.

For this reason, when the lithium secondary battery is stored at high temperatures in a fully charged state, there is a problem in that the solid electrolyte interphase (SEI) is gradually destructed over time. The destruction of the solid electrolyte interphase (SEI) exposes the negative electrode surface. The exposed surface of the negative electrode is decomposed while reacting with the carbonate-based solvent in the electrolyte, causing a continuous side reaction. This side reaction continuously generate gas.

Regardless of the type, the gas generated in this way increases the internal pressure of the lithium secondary battery, acts as a resistance to the movement of lithium, expands the volume (thickness) of the secondary battery, causes great problems in reducing the weight of the secondary battery, and deteriorates the performance of the secondary battery.

As the field of application of lithium secondary batteries has recently expanded, stability and long lifespan characteristics in high temperature environment are constantly required. This performance is greatly influenced by the solid electrolyte interphase (SEI film) formed by the initial reaction of the electrode and the electrolyte.

DISCLOSURE

Technical Problem

Therefore, in order to improve high-temperature cycle characteristics and low-temperature power of lithium secondary batteries, the development of additives capable of suppressing the side reaction between the positive electrode and the electrolyte and forming a firm solid electrolyte interphase (SEI) film on the surface of the negative electrode is continuously required.

In order to solve the above problem, the present invention is to provide a non-aqueous electrolyte for a lithium secondary battery containing an additive capable of forming a stable solid electrolyte interphase (SEI) on an electrode surface, particularly a negative electrode surface.

In addition, in order to solve the above problem, the present invention is to provide an electrolyte additive for a secondary battery having an excellent effect of removing decomposition products generated from lithium salt as well as forming a firm solid electrolyte interphase (SEI) film on the surface of an electrode, particularly the surface of a negative electrode.

In addition, in order to solve the problem of the prior art, the present invention is to provide a non-aqueous electrolyte for a lithium secondary battery capable of improving high-temperature stability without deterioration of high-temperature lifespan and performance of the lithium secondary battery, and a lithium secondary battery comprising the non-aqueous electrolyte for a lithium secondary battery.

Technical Solution

A non-aqueous electrolyte for a lithium secondary battery according to an embodiment of the present invention comprises:

a compound containing an imidazole group and a pyridine group as an additive, a lithium salt, an additional additive, and a non-aqueous organic solvent.

A non-aqueous electrolyte for a lithium secondary battery according to an embodiment of the present invention comprises:

a compound containing an imidazole group and a pyridine group represented by chemical formula 1 below as an additive, a lithium salt, an additional additive, and a non-aqueous organic solvent.

[chemical formula 1]

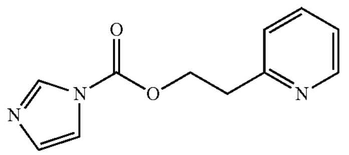

One embodiment of the present invention provides a lithium secondary battery comprising the non-aqueous electrolyte for a lithium secondary battery, a positive electrode, a negative electrode, and a separator.

The negative electrode may include a carbon-based negative electrode active material and a silicon-based negative electrode active material.

The negative electrode may include a carbon-based negative electrode active material and a silicon-based negative electrode active material in a weight ratio of 97:3 to 50:50.

The negative electrode may include a carbon-based negative electrode active material and a silicon-based negative electrode active material in a weight ratio of 90:10 to 60:40.

Advantageous Effects

The compound containing an imidazole group and a pyridine group, especially the compound represented by chemical formula 1, provided as an additive for the non-aqueous electrolyte of the present invention, can remove Lewis acids such as HF and $PF_5$, which are generated by the decomposition of anions when the secondary battery is exposed to a high temperature, from an inside of the electrolyte, because the nitrogen atom in the imidazole group acts as a Lewis base. Therefore, the compound containing an imidazole group and a pyridine group, particularly the compound represented by chemical formula 1, provided as an additive to the non-aqueous electrolyte of the present invention, can suppress the deterioration of the surface film (SEI) of the positive electrode or negative electrode caused by Lewis acid, thereby prevent additional decomposition of the electrolyte of the secondary battery due to the destruction of the SEI, and can also suppress self-discharge of the secondary battery. The imidazole group also serves to form a stable SEI on the surface of the negative electrode.

The additive comprised in the non-aqueous electrolyte of the secondary battery of the present invention, that is, the compound containing an imidazole group and a pyridine group, particularly the compound represented by chemical formula 1, has the above effects, so that the lifespan of the lithium secondary battery is not deteriorated even when the lithium secondary battery is exposed to a high temperature, and the increase of resistance or generation of gas in the lithium secondary battery is suppressed when the secondary battery is stored at a high temperature, thereby reducing the volume expansion of the secondary battery. Thus, a secondary battery with improved performance is realized.

MODES OF THE INVENTION

Hereinafter, the present invention will be described in more detail through examples. Since these examples are only for illustrating the present invention, the scope of the present invention should not be construed as being limited by these examples.

Terms such as “comprise”, “include”, “contain”, “have” and the like used in this specification are open-ended terms that imply the possibility of including other components, unless otherwise specified in the phrase or sentence in which the expression is included.

In this specification, “%” means weight % unless explicitly indicated otherwise.

Hereinafter, an electrolyte additive of the present invention for lithium secondary batteries, a non-aqueous electrolyte for lithium secondary batteries, and a lithium secondary battery comprising the non-aqueous electrolyte will be described in detail.

<An Electrolyte Additive for a Lithium Secondary Battery>

The present invention provides a compound containing an imidazole group and a pyridine group as an additive for an electrolyte for a lithium secondary battery, particularly a compound containing an imidazole group and a pyridine group represented by chemical formula 1 below.

[chemical formula 1]

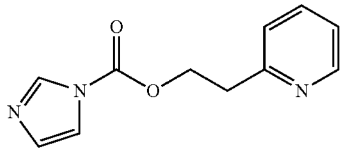

<An Electrolyte for a Lithium Secondary Battery>

The present invention provides an electrolyte for a lithium secondary battery comprising:

- a compound containing an imidazole group and a pyridine group as an additive,
- an additional additive,
- a lithium salt, and
- a non-aqueous organic solvent.

The present invention provides an electrolyte for a lithium secondary battery comprising:

- a compound containing an imidazole group and a pyridine group represented by chemical formula 1,
- an additional additive,
- a lithium salt, and
- a non-aqueous organic solvent.

The compound containing an imidazole group and a pyridine group may be included in an amount of 0.05 to 20% by weight based on the total weight of the electrolyte for a lithium secondary battery.

The compound containing an imidazole group and a pyridine group may be preferably included in an amount of 0.05 to 10% by weight based on the total weight of the electrolyte for a lithium secondary battery.

The compound containing an imidazole group and a pyridine group may be more preferably included in an amount of 0.05 to 5% by weight, 0.05 to 3% by weight, or 0.05 to 2% by weight based on the total weight of the electrolyte for a lithium secondary battery.

The compound containing an imidazole group and a pyridine group may be included in an amount of 0.1 to 20% by weight based on the total weight of the electrolyte for a lithium secondary battery.

The compound containing an imidazole group and a pyridine group may be preferably included in an amount of 0.1 to 10% by weight based on the total weight of the electrolyte for a lithium secondary battery.

The compound containing an imidazole group and a pyridine group may be more preferably included in an amount of 0.1 to 5% by weight, 0.1 to 3% by weight, or 0.1 to 2% by weight based on the total weight of the electrolyte for a lithium secondary battery.

When the compound containing an imidazole group and a pyridine group is included in an amount of less than 0.05% by weight based on the total weight of the electrolyte for a lithium secondary battery, the effect of preventing volume expansion and reducing the internal resistance of a lithium secondary battery is not sufficient. When the compound containing a imidazole group and a pyridine group is included in an amount of more than 20% by weight based on the total weight of the electrolyte for a lithium secondary battery, high-temperature lifespan characteristics and high-temperature storage characteristics are deteriorated due to an increase in internal resistance and a decrease in capacity of the secondary battery.

The electrolyte for a lithium secondary battery may comprise one or more additional additive selected from the group composed of a halogen-substituted or unsubstituted carbonate-based compound, a nitrile-based compound, a borate-based compound, a lithium salt-based compound, a phosphate-based compound, a sulfite-based compound, a sulfone-based compound, a sulfate-based compound, and a sultone-based compound.

Representative examples of the additional additive include lithium difluorophosphate, lithium tetrafluoro(oxalate)phosphate, lithium bis(fluorosulfonyl)imide, 1,3-propane sultone, 1,3-propene sultone, fluoroethylene carbonate, vinylene carbonate, and vinyl ethylene carbonate.

The additional additive may be included in an amount of 0.05 to 20% by weight based on the total weight of the electrolyte for a lithium secondary battery.

The additional additive may be preferably included in an amount of 0.05 to 10% by weight based on the total weight of the electrolyte for a lithium secondary battery.

The additional additive may be more preferably included in an amount of 0.05 to 5% by weight, specifically 0.05 to 3% by weight based on the total weight of the electrolyte for a lithium secondary battery.

When the additional additive is included in an amount of less than 0.05% by weight based on the total weight of the lithium secondary battery electrolyte, the effect of forming a solid electrolyte interphase on the electrode is insignificant, thereby, the effect of suppressing side reactions between the electrode and the electrolyte may be reduced. When the additional additive is included in an amount of more than 20% by weight based on the total weight of the electrolyte for a lithium secondary battery, an excessively thick film is formed on the surface of the electrode, and interfacial resistance increases, resulting in a decrease in capacity.

The lithium salt may include at least one or more selected from the group consisting of $LiPF_6$, $LiClO_4$, $LiAsF_6$, $LiBF_4$, $LiBF_6$, $LiSbF_6$, $LiAlO_4$, $LiAlCl_4$, $LiClO_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, and $LiB(C_2O_4)_2$.

It is preferable to use a lithium salt having a high dissociation degree of lattice energy, excellent ionic conductivity, and excellent thermal stability and oxidation resistance. The lithium salt acts as a passage for the movement of lithium ions in the secondary battery, enabling basic operation of the lithium secondary battery.

The concentration of the lithium salt may be 0.1 to 2.5 M (mol/L) with respect to the total amount of the electrolyte for a lithium secondary battery.

The concentration of the lithium salt may be preferably 0.3 to 2.5 M (mol/L) with respect to the total amount of the electrolyte for a lithium secondary battery, in consideration of properties related to electrical conductivity, and viscosity related to the mobility of lithium ions.

The concentration of the lithium salt may be more preferably 0.7 to 1.6 M (mol/L) with respect to the total amount of the electrolyte for a lithium secondary battery, in consideration of properties related to electrical conductivity, and viscosity related to the mobility of lithium ions.

When the concentration of the lithium salt is less than 0.1 M, the electrical conductivity of the electrolyte for a lithium secondary battery is lowered, so that the performance of the non-aqueous electrolyte that transfers ions at a high speed between the positive electrode and the negative electrode of a lithium secondary battery is deteriorated. When the concentration of the lithium salt is more than 2.5 M, there is a problem in that the viscosity of the electrolyte for a lithium secondary battery increases, so that the mobility of lithium ions decreases and the performance of a secondary battery deteriorates at a low temperature.

The non-aqueous organic solvent may be a linear carbonate-based solvent, a cyclic carbonate-based solvent, or a mixture thereof.

The linear carbonate-based solvent may include at least one or more selected from the group consisting of dimethyl carbonate (DMC), diethyl carbonate (DEC), dipropyl carbonate (DPC), ethyl propyl carbonate (EPC), ethyl methyl carbonate (EMC) and methyl propyl carbonate (MPC).

In addition, the cyclic carbonate-based solvent may include at least one or more selected from the group consisting of ethylene carbonate (EC), propylene carbonate (PC), 1,2-butylene carbonate (BC), vinylene carbonate (VC) and fluoroethylene carbonate (FEC).

It may be preferable to use a mixture of a cyclic carbonate-based organic solvent having a high dielectric constant and a linear carbonate-based organic solvent, wherein the cyclic carbonate-based organic solvent has a high ionic conductivity so that is capable of improving the charge/discharge performance of a secondary battery and wherein the linear carbonate-based organic solvent has a low viscosity so that is capable of appropriately adjusting the high viscosity of the cyclic carbonate-based organic solvent.

Specifically, a cyclic carbonate-based organic solvent having a high dielectric constant selected from the group consisting of ethylene carbonate (EC), propylene carbonate (PC), and a mixture thereof and a linear carbonate-based organic solvent having a low viscosity selected from the group consisting of dimethyl carbonate (DMC), diethyl carbonate (DEC), ethyl methyl carbonate (EMC), and a mixture thereof may be mixed.

The cyclic carbonate solvent has a high polarity so that is sufficiently able to dissociate lithium ions. It, however, has a high viscosity so that the ionic conductivity is low. Therefore, by mixing a cyclic carbonate-based organic solvent with a linear carbonate-based organic solvent having a low viscosity despite its low polarity, characteristics of a lithium secondary battery may be optimized.

Therefore, it may be preferable to mix one or more solvent selected from the cyclic carbonate-based solvent with one or more solvent selected from the linear carbonate-based solvent and use the mixture as the non-aqueous organic solvent.

The mixed solvent of the linear carbonate-based solvent and the cyclic carbonate-based solvent may be used by mixing the linear carbonate-based solvent and the cyclic carbonate-based solvent in a volume ratio of 9:1 to 1:9.

The mixed solvent of the linear carbonate-based solvent and the cyclic carbonate-based solvent may preferably be used by mixing the linear carbonate-based solvent and the cyclic carbonate-based solvent in a volume ratio of 8:2 to 2:8 in light of lifespan characteristics and storage characteristics of a secondary battery.

The non-aqueous organic solvent may include ethylene carbonate (EC), propylene carbonate (PC), ethyl methyl carbonate (EMC), and diethyl carbonate (DEC).

The non-aqueous organic solvent may include 5 to 40% by weight of ethylene carbonate (EC), 5 to 20% by weight of propylene carbonate (PC), 10 to 70% by weight of ethyl methyl carbonate (EMC), and 10 to 60% by weight of diethyl carbonate (DEC).

Specifically, among the cyclic carbonate-based solvents, ethylene carbonate (EC) or propylene carbonate (PC) having a high dielectric constant may be used. When artificial graphite is used as a negative electrode active material, it is preferable to use ethylene carbonate (EC). Among the linear carbonate-based solvents, it is preferable to use dimethyl carbonate (DMC), ethyl methyl carbonate (EMC), or diethyl carbonate (DEC) having a low viscosity.

The non-aqueous organic solvent may be included in an amount of 5% to 80% with respect to the total amount of the electrolyte for a lithium secondary battery. The non-aqueous organic solvent may be included in an amount of 5% to 70% with respect to the total amount of the electrolyte for a lithium secondary battery.

<A Lithium Secondary Battery>

A lithium secondary battery comprising the non-aqueous electrolyte does not deteriorate high temperature lifespan characteristics, does not increase resistance when stored at a high temperature, and has excellent performance of suppressing expansion of the volume (thickness) of the secondary battery.

Hereinafter, the lithium secondary battery of the present invention will be described in detail.

The lithium secondary battery of the present invention comprises:

- a positive electrode,
- a negative electrode,
- a separator, and
- a non-aqueous electrolyte.

The positive electrode may include at least one positive electrode active material selected from the group consisting of lithium metal oxides such as $LiCoO_2$, $LiFePO_4$, $LiMnO_2$, $LiMn_2O_4$, $LiNiO_2$, and $LiNi_{1-x-y}Co_xM_yO_2$ ($0 \leq x \leq 1$, $0 \leq y \leq 1$, $0x+y \leq 1$, M is Al, Sr, Mg, Mn or La).

The negative electrode may include at least one negative electrode active material selected from the group consisting of silicon, silicon compound, tin, tin compound, lithium titanate, crystalline carbon, amorphous carbon, artificial graphite, natural graphite, and a mixture of artificial graphite and natural graphite.

The separator may consist of a single porous polymer film made of at least one polyolefin-based polymer selected from ethylene polymer, propylene polymer, ethylene/butene copolymer, and an ethylene/hexene copolymer, or may consist of a laminate thereof. The separator may include a coating film coated with a ceramic or polymeric material.

The non-aqueous electrolyte may comprise:

- a compound containing an imidazole group and a pyridine group, particularly a compound containing an imidazole group and a pyridine group represented by chemical formula 1 below,
- an additional additive,
- a lithium salt, and
- a non-aqueous organic solvent.

[chemical formula 1]

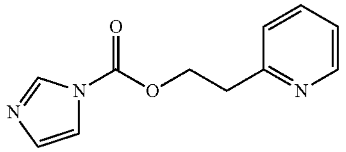

Examples of the lithium secondary battery include, but are not limited to, a lithium metal secondary battery, a lithium ion secondary battery, a lithium polymer secondary battery, and a lithium ion polymer secondary battery.

More specifically, the positive electrode active material is preferably a composite metal oxide of lithium and one or more material selected from cobalt, manganese, and nickel. The solid solution ratio of cobalt, manganese, and nickel metals of the composite metal oxide may be various. In addition to these cobalt, manganese, and nickel, the positive electrode active material may include one or more element selected from the group consisting of Mg, Al, K, Na, Ca, Si, Ti, Sn, V, Ge, Ga, B, As, Zr, Cr, Fe, Sr, V, and rare earth element.

Specifically, as the positive electrode active material, lithium metal oxides such as $LiCoO_2$, $LiFePO_4$, $LiMnO_2$, $LiMn_2O_4$, $LiNiO_2$, and $LiNi_{1-x-y}Co_xM_yO_2$ (0x≤1, 0≤y≤1, 0≤x+y≤1, M is Al, Sr, Mg, Mn or La), or lithium intercalation compounds such as lithium chalcogenide compounds may be used, but is not limited thereto. Any material usable as a positive electrode active material in a secondary battery may be used.

The positive electrode comprises a current collector and a positive electrode active material layer formed on the current collector. The positive electrode active material layer may comprise a positive electrode active material capable of absorbing, storing and releasing lithium; a binder; a conductive material; and the like.

The negative electrode comprises a current collector and a negative electrode active material layer formed on the current collector. The negative electrode active material layer may comprise a negative electrode active material capable of intercalating and deintercalating lithium; a binder; a conductive material; and the like. As the negative electrode active material, a crystalline carbon, an amorphous carbon, a carbon composite, a carbon fiber, a lithium metal, a lithium alloy, or a carbon-silicon composite may be used, but is not limited thereto. Any material usable as a negative electrode active material in a secondary battery may be used.

The positive electrode and/or negative electrode may be prepared by dispersing an electrode active material, a binder and a conductive material, and, if necessary, a thickener in a solvent to prepare an electrode slurry composition, and then applying the electrode slurry composition to an electrode current collector. Aluminum or an aluminum alloy may be commonly used as the positive electrode current collector. Copper or copper alloy may be commonly used as the negative electrode current collector.

A form of the positive electrode current collector and the negative electrode current collector may include a foil and a mesh.

The binder is a material that acts as a paste of active materials, a mutual adhesion of active materials, an adhesion of active materials to a current collector, and a buffer on expansion and contraction of active materials. Any binder that can be used by those skilled in the art may be used. For example, polyvinyl alcohol, carboxymethyl cellulose, hydroxypropyl cellulose, diacetyl cellulose, polyvinyl chloride, carboxylated polyvinyl chloride, polyvinyl fluoride, polyethylene oxide, polyvinylpyrrolidone, polyurethane, polytetrafluoroethylene, polyvinylidene fluoride (PVdF), copolymer of polyhexafluoropropylene-polyvinylidene fluoride (PVdF/HFP), poly(vinyl acetate), alkylated polyethylene oxide, polyvinyl ether, poly(methyl methacrylate), poly(ethyl acrylate), polyacrylonitrile, polyvinylpyridine, polyethylene, polypropylene, styrene-butadiene rubber, acrylated styrene-butadiene rubber, acrylonitrile-butadiene rubber, epoxy resin, nylon, etc. may be used, but is not limited thereto.

The conductive material is used to impart conductivity to the electrode. Any electrically conductive material that does not cause chemical change in the secondary battery may be used. As the conductive material, at least one selected from the group consisting of a graphite-based conductive material, a carbon black-based conductive material, and a metal-based or metal compound-based conductive material may be used. Examples of the graphite-based conductive material include artificial graphite and natural graphite. Examples of the carbon black-based conductive material include acetylene black, ketjen black, denka black, thermal black, channel black, etc. Examples of the metal-based or metal compound-based conductive material include perovskite material such as $LaSrMnO_3$, $LaSrCoO_3$, potassium titanate, titanium oxide, tin phosphate ($SnPO_4$), tin oxide, and tin. However, it is not limited to the above-listed conductive materials.

The thickener is not limited to particular one as long as it can play a role in adjusting the viscosity of the active material slurry. For example, carboxymethyl cellulose, hydroxymethyl cellulose, hydroxyethyl cellulose, hydroxypropyl cellulose, and the like can be used.

A non-aqueous solvent or an aqueous solvent may be used as a solvent in which the electrode active material, the binder, the conductive material, etc. are dispersed. Examples of the non-aqueous solvent include N-methyl-2-pyrrolidone (NMP), dimethylformamide, dimethylacetamide, N,N-dimethylaminopropylamine, ethylene oxide, or tetrahydrofuran. Examples of the aqueous solvent include water and the like.

The lithium secondary battery may comprise a separator preventing a short circuit between a positive electrode and a negative electrode and providing a passage for lithium ions. As the separator, a polyolefin-based polymer film or multilayers thereof such as polypropylene, polyethylene, polyethylene/polypropylene, polyethylene/polypropylene/polyethylene, and polypropylene/polyethylene/polypropylene, a microporous film, a woven fabric, and a non-woven fabric may be used. In addition, the porous polyolefin film coated with a resin having excellent stability may be used as the separator.

In addition, the lithium secondary battery may be made in various shapes such as a prismatic shape, a cylindrical shape, a pouch shape, or a coin shape.

SPECIFIC EXAMPLES OF THE INVENTION

Hereinafter, the present invention will be described in more detail through examples. It should not be construed that the scope of the present invention is limited by these examples.

<Method for Preparing the Compound of Chemical Formula 1>

Synthesis of 2-(pyridin-2-yl)ethyl 1H-imidazole-1-carboxylate (Compound of Chemical Formula 1)

After a $N_2$ purge line, a dropping funnel, and a thermometer were attached to a 1000 mL three-necked flask, 1.23 mol of 1, 1'-carbonyldiimidazole and 400 mL of dichloromethane were added and stirred. The inside of the reactor was filled with a nitrogen atmosphere, and the temperature was cooled from room temperature to 10° C. While maintaining the temperature, 1.36 mol of 2-pyridineethanol was added dropwise over 30 minutes. After the addition of 2-pyridine ethanol was completed, the temperature was changed from 10° C. to room temperature, and the reaction was performed at the same temperature for 4 hours. After the reaction was completed, 400 mL of water was added, and then the organic layer was extracted. This process was repeated three times. After treatment with $MgSO_4$ to remove moisture, filtration was performed, and concentration was performed to remove dichloromethane in the filtrate. A powder was thus obtained. After drying the powder in a vacuum oven, the final compound 2-(pyridin-2-yl)ethyl 1H-imidazole-1-carboxylate was obtained. The yield was 50%.

$^1$H NMR (Chloroform-d, 8 ppm): 1H 8.5 ppm, 1H 8.0 ppm, 1H 7.6 ppm, 1H 7.4 ppm, 2H 7.4 ppm, 1H 7.0 ppm, 2H 4.8 ppm, 2H 3.3 ppm HRMS: $C_{11}H_{11}N_3O_2S$ (M+): 217.09

<Preparation of Electrolyte for Lithium Secondary Battery Containing 2-(Pyridin-2-yl)ethyl 1H-imidazole-1-carboxylate (Chemical Formula 1)>

After dissolving $LiPF_6$ to 1.0 M in a mixed solvent of ethylene carbonate (EC) and ethyl methyl carbonate (EMC) (EC/EMC=25/75 volume ratio), 1.0% by weight of fluoroethylene carbonate (FEC), 1.0% by weight of lithium difluorophosphate ($LiPO_2F_2$), 0.5% by weight of propane sultone (PS), 0.5% by weight of ethylene sulfate (Esa), and 0.5% by weight of the above 2-(pyridin-2-yl)ethyl 1H-imidazole-1-carboxylate represented by chemical formula 1 were added to the solution to prepare an electrolyte for a lithium secondary battery containing the compound of chemical formula 1.

<Preparation of a Lithium Secondary Battery Containing an Electrolyte Containing the Compound of Chemical Formula 1>

94% by weight of NCM-based positive electrode active material containing $Li[Ni_xCo_{1-x-y}Mn_y]O_2$ ($0<x<0.5$, $0<y<0.5$), 3% by weight of conductive material (Super-P), 3% by weight of binder (PVdF) were added to an organic solvent, N-methyl 2-pyrrolidone (NMP) to prepare a positive electrode active material slurry. The positive electrode active material slurry was applied to an aluminum thin foil, which is a current collector of a positive electrode, dried, and then rolled with a roll press to make a positive electrode. In addition, a negative electrode active material slurry was prepared by mixing 96% by weight of a graphite-based negative electrode active material containing $SiO_x$($0<x<2$), 1% by weight of a conductive material (Super-P), 1.5% by weight of binder SBR, and 1.5% by weight of CMC. The negative electrode active material slurry was applied to a copper thin foil, which is a current collector of a negative electrode, and dried to prepare a negative electrode.

A positive electrode and a negative electrode prepared as described above were put, and a separator was interposed therebetween. Thereafter, an electrolyte for a lithium secondary battery containing the compound of chemical formula 1 is injected between the two electrodes to prepare a lithium secondary battery in the form of an aluminum pouch (Al-Pouch type) comprising an electrolyte containing the compound of chemical formula 1.

COMPARATIVE EXAMPLE

<Preparation of Electrolyte for Lithium Secondary Battery Containing 1,3-Propene Sultone (PRS) Additive>

The non-aqueous electrolyte for a lithium secondary battery may contain a sultone-based compound as necessary to prevent the non-aqueous electrolyte from decomposing to result in hindering stability of a secondary battery at a high temperature and expanding a secondary battery at a high temperature. The sultone-based compound may be, for example, one or more compounds selected from the group consisting of 1,3-propane sultone (PS), 1,4-butane sultone (BS), ethen sultone, 1,3-propene sultone, 1,4-butene sultone and 1-methyl-1,3-propene sultone. In this comparative example, 1,3-propene sultone (PRS), which is currently generally used, was used.

After dissolving $LiPF_6$ to 1.0 M in a mixed solvent of ethylene carbonate (EC) and ethyl methyl carbonate (EMC) (EC/EMC=25/75 volume ratio), 1.0% by weight of fluoroethylene carbonate (FEC), 1.0% by weight of lithium difluorophosphate ($LiPO_2F_2$), 0.5% by weight of propane sultone (PS), 0.5% by weight of ethylene sulfate (Esa), and 0.5% by weight of 1,3-propene sultone (PRS) additive were added to the mixed solution to prepare an electrolyte for a lithium secondary battery.

<Manufacture of Lithium Secondary Battery Comprising An Electrolyte Containing 1,3-Propene Sultone (PRS) Additive>

A lithium secondary battery comprising an electrolyte containing not 2-(pyridin-2-yl)ethyl 1H-imidazole-1-carboxylate compound represented by chemical formula 1 but 1,3-propene sultone (PRS) was manufactured in the same manner as in the manufacturing of the lithium secondary battery of the above example, except that 2-(pyridin-2-yl)ethyl 1H-imidazole-1-carboxylate compound represented by chemical formula 1 was not added to the electrolyte but 1,3-propene sultone (PRS) was added to the electrolyte.

The composition of the electrolyte for a lithium secondary battery of the above example and comparative example was shown in table 1 below.

<Composition of an Electrolyte for a Lithium Secondary Battery>

TABLE 1

| | chemical formula 1 | 1,3-propene sultone (PRS) | fluoroethylene carbonate (FEC) | lithium difluorophosphate ($LiPO_2F_2$) | 1,3-propane sultone (PS) | ethylene sulfate (Esa) |
|---|---|---|---|---|---|---|
| example | ○ | | ○ | ○ | ○ | ○ |
| comparative example | | ○ | ○ | ○ | ○ | ○ |

EXPERIMENTAL EXAMPLE

Experimental Example 1

Measurement of Lifespan Capacity Retention Rate at a High Temperature (45° C.)

After charging the lithium secondary battery in the form of a pouch made using the electrolyte for a lithium secondary battery of the above example and comparative example at a high temperature (45° C.) to 4.2V at a 1C-rate, 10 minutes of rest time was made. After discharging to 2.7V at a 1C-rate, there was another 10 minutes rest period. The above process was repeated 100 times. Discharge capacity (mAh) and lifespan capacity retention rate (%) of the secondary battery were measured. Table 2 shows the results by comparing the discharge capacity and lifespan capacity retention rate of the measured secondary battery.

TABLE 2

| | 1 cycle discharge capacity (mAh) | 100 cycle discharge capacity (mAh) | lifespan capacity retention rate (%) |
|---|---|---|---|
| example | 906.9 | 793.2 | 87.4 |
| comparative example | 874.3 | 747.1 | 85.6 |

As shown in Table 2, as a result of evaluation at a high temperature, the lithium secondary battery of the example showed a higher lifespan capacity retention rate at a high temperature than the lithium secondary battery of the comparative example.

Accordingly, the lithium secondary battery of the example comprising an electrolyte containing a compound represented by chemical formula 1, showed a higher lifespan capacity retention rate than the lithium secondary battery of the comparative example without deterioration of a high-temperature lifespan performance. That is, the additive of chemical formula 1 compound improved the lifespan capacity retention rate at a high temperature without deterioration in performance due to side reactions with other additives.

Experimental Example 2

Measurement of High Temperature (60° C.) Storage Characteristics

After storing the lithium secondary battery in the form of a pouch prepared using the electrolyte for a lithium secondary battery of the example and comparative example at a high temperature (60° C.) for 4 weeks, the IR (internal resistance) of the battery and the volume change rate of the secondary battery were measured. Table 3 below shows the results of the internal resistance (IR) change rate of the secondary battery and the volume change rate of the secondary battery after 4 weeks of storage compared to 0 week at a high temperature (60° C.).

TABLE 3

| | internal resistance (IR) increase rate after 4 weeks of storage at 60° C. (%) | volume increase rate after 4 weeks of storage at 60° C. (%) |
|---|---|---|
| example | 94.5 | 0.8 |
| comparative example | 129.1 | 0.5 |

The rate of increase in internal resistance (IR) of the lithium secondary battery of the example was lower than that of the lithium secondary battery of the comparative example. So the performance of the lithium secondary battery of the example was excellent.

It can be said that the volume increase rate is the same (0.3% is equivalent without a significant difference).

Experimental Example 3

AC Impedance Measurement

The lithium secondary batteries of the example and the comparative example were stored at a high temperature (60° C.) for 4 weeks, and then charged at 1.0C CC/CV (4.2V Cut-off). Thereafter, AC impedance was measured using an impedance analyzer. The measurement results of AC impedance are shown in Table 4.

TABLE 4

| | $R_{cell}$ |
|---|---|
| example | 0.13 |
| comparative example | 0.21 |

As shown in Table 4, the lithium secondary battery of the example showed a very small AC impedance compared to the lithium secondary battery of the comparative example. Internal resistance of the lithium secondary battery of the example after being left at a high temperature (60° C.) for 4 weeks was smaller than that of the lithium secondary battery of the comparative example.

The invention claimed is:

1. A non-aqueous electrolyte for a lithium secondary battery comprising:
an additive,
an additional additive,
a lithium salt, and
a non-aqueous organic solvent,
wherein the additive is a compound represented by chemical formula 1 below:

<chemical formula 1>

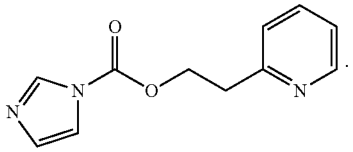

2. The non-aqueous electrolyte for a lithium secondary battery according to claim 1, wherein the additive is included in an amount of 0.05% to 20% by weight based on the total weight of the non-aqueous electrolyte for a lithium secondary battery.

3. The non-aqueous electrolyte for a lithium secondary battery according to claim 1, wherein the additional additive is one or more selected from the group composed of a halogen-substituted or unsubstituted carbonate-based compound, a nitrile-based compound, a borate-based compound, a lithium salt-based compound, a phosphate-based compound, a sulfite-based compound, a sulfone-based compound, a sulfate-based compound, and a sultone-based compound.

4. A lithium secondary battery comprising:
the non-aqueous electrolyte for a lithium secondary battery according to claim 1,
a positive electrode,
a negative electrode, and
a separator.

5. The lithium secondary battery according to claim 4, wherein the negative electrode comprises a carbon-based negative electrode active material and a silicon-based negative electrode active material.

6. The lithium secondary battery according to claim 5, wherein the carbon-based negative electrode active material and the silicon-based negative electrode active material are comprised in a weight ratio of 97:3 to 50:50.

7. The lithium secondary battery according to claim 6, wherein the carbon-based negative electrode active material and the silicon-based negative electrode active material are comprised in a weight ratio of 90:10 to 60:40.

* * * * *